US010296357B2

(12) United States Patent
Sawada et al.

(10) Patent No.: US 10,296,357 B2
(45) Date of Patent: May 21, 2019

(54) PORTABLE TERMINAL DEVICE SPECIFYING CONTENT RELATED TO FIRST APPLICATION AND COPYING CONTENT TO A SECOND APPLICATION UPON PREDETERMINED EVENT OR OPERATION

(71) Applicant: YAHOO JAPAN CORPORATION, Tokyo (JP)

(72) Inventors: Koichi Sawada, Tokyo (JP); Ayaka Hirano, Tokyo (JP); Shinya Kato, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 290 days.

(21) Appl. No.: 14/487,565

(22) Filed: Sep. 16, 2014

(65) Prior Publication Data
US 2015/0220427 A1 Aug. 6, 2015

(30) Foreign Application Priority Data

Feb. 6, 2014 (JP) ................. 2014-021784

(51) Int. Cl.
G06F 9/54 (2006.01)
G06F 16/00 (2019.01)
(Continued)

(52) U.S. Cl.
CPC ............ G06F 9/451 (2018.02); G06F 3/0487 (2013.01); G06F 3/0488 (2013.01); G06F 9/543 (2013.01); G06F 16/00 (2019.01); G06F 3/04883 (2013.01)

(58) Field of Classification Search
None
See application file for complete search history.

(56) References Cited

U.S. PATENT DOCUMENTS 8,296,671 B2* 10/2012 Narayanan .............. G06F 9/543
715/764
8,429,551 B2* 4/2013 Kim .................. G06F 17/30884
715/234
(Continued)

FOREIGN PATENT DOCUMENTS

JP A-2001-147759 5/2001
JP A-2003-241879 8/2003
(Continued)

OTHER PUBLICATIONS

Jan. 20, 2015 Office Action issued in Japanese Patent Application No. 2014-021784.
(Continued)

Primary Examiner — Reginald G Bragdon
Assistant Examiner — Marwan Ayash
(74) Attorney, Agent, or Firm — Oliff PLC

(57) ABSTRACT

A terminal device according to the present application includes an acceptance unit, a detection unit, and a storage unit. The acceptance unit accepts a specifying operation for specifying a piece of content related to a first application. The detection unit detects a predetermined executing operation after the acceptance unit accepts the specifying operation. Upon detection of the executing operation by the detection unit, the storage unit stores the piece of content specified by the specifying operation in a storage region used by a second application.

15 Claims, 13 Drawing Sheets

(51) Int. Cl.
*G06F 9/451* (2018.01)
*G06F 3/0487* (2013.01)
*G06F 3/0488* (2013.01)

(56) References Cited

U.S. PATENT DOCUMENTS

| | | | | |
|---|---|---|---|---|
| 8,453,066 | B2* | 5/2013 | Ozzie | G06F 9/543 |
| | | | | 715/764 |
| 8,793,624 | B2* | 7/2014 | Santoro | G06F 3/04883 |
| | | | | 345/156 |
| 9,710,147 | B2* | 7/2017 | Kwon | G06F 3/04845 |
| 2003/0236775 | A1* | 12/2003 | Patterson | G06F 9/4443 |
| 2010/0295791 | A1* | 11/2010 | Nishimura | G06F 17/24 |
| | | | | 345/168 |
| 2011/0137548 | A1 | 6/2011 | Shen et al. | |
| 2012/0246594 | A1* | 9/2012 | Han | G06F 3/0486 |
| | | | | 715/790 |
| 2012/0293421 | A1* | 11/2012 | Santoro | G06F 3/04883 |
| | | | | 345/173 |
| 2014/0033071 | A1 | 1/2014 | Gruber et al. | |
| 2014/0258905 | A1* | 9/2014 | Lee | G06F 3/0486 |
| | | | | 715/770 |
| 2014/0365919 | A1* | 12/2014 | Shaw | H04L 12/1822 |
| | | | | 715/753 |
| 2015/0026620 | A1* | 1/2015 | Kwon | G06F 3/04845 |
| | | | | 715/770 |
| 2015/0074575 | A1* | 3/2015 | Jeon | G06F 3/04886 |
| | | | | 715/768 |
| 2016/0139766 | A1* | 5/2016 | Kim | G06F 3/04817 |
| | | | | 715/802 |

FOREIGN PATENT DOCUMENTS

| | | |
|---|---|---|
| JP | A-2005-250605 | 9/2005 |
| JP | A-2007-200243 | 8/2007 |
| JP | A-2009-176118 | 8/2009 |
| JP | A-2011-155529 | 8/2011 |
| JP | A-2012-38271 | 2/2012 |
| JP | A-2013-206394 | 10/2013 |

OTHER PUBLICATIONS

May 1, 2011 "ClipClipper," Currach Software Mobile, pp. 1-2, URL: http://m.currach.net/i/clipclipper/jpn.html (with abstract).
Jun. 21, 2012 "Easy Memo," Kitamura Co., LTD., pp. 1-2, URL: http://www.smahoto.jp/use/enjoy/items/41.html (with abstract).
Nov. 19, 2013 "CopyCenter Free," Appbank, pp. 1-10, URL: http://www.appbank.net/2013/11/19/iphone-application/702504.php (with abstract).
Chikusa, Kikuzato, Aug. 24, 2010, "Advanced Features of iOS4 Installed on iPhone 4: Part 2 Multitasking of iOS4 While Keeping the Power Consumption Low," *Monthly ASCII. Technologies*, ASCII Media Works Inc., p. 90, vol. 15, No. 10 (with abstract).
Sep. 29, 2011 "Memo Pad," Nexas, pp. 1-7, URL: http://octoba.net/archives/20110929-android-2132.html (with abstract).
Mar. 2, 2012 "Complete Evaluation of iPhone Note-taking Applications," Matomedia, pp. 1, 11, 12 and 17, URL: http://www.matomedia.jp/iphone-apps/rank/memo.html (with abstract).
Jul. 8, 2014 Office Action issued in Japanese Application No. 2014-021784 (with translation).
Sep. 29, 2011 "Memo Pad," Nexxas, pp. 1-7, URL: http://octoba.net/archives/20110929-android-2132.html (with abstract).
Nov. 7, 2017 Office Action issued in Japanese Patent Application No. 2015-051493.
Jan. 27, 2014, "Easy Structure of iOS-Android," Nikkei Personal Computer No. 690, Nikkei Personal Computing, Japan, Nikkei Business Publications, Inc., pp. 99-103.
Jan. 11, 2011, "Clipstore: Full practical use of the clip board to enable a copy and paste comfortably," Android application 1337, Japan, Octoba, URL, https://octoba.net/archives/20110111-clipstore-android-1337.html.

* cited by examiner

| CONTENT ID | CONTENT |
|---|---|
| M2 | http://www.aa.co.jp/t1 |

| CONTENT ID | SAVE DATE AND TIME | CONTENT |
|---|---|---|
| M1 | 2014/1/20 12:00:00 | MEMO 1 |
| M2 | 2014/1/28 14:00:00 | http://www.aa.co.jp/t1 |
| ... | ... | ... |

| CONTENT ID | SAVE DATE AND TIME | CONTENT | CATEGORY ID | GROUP ID | ALARM TIME |
|---|---|---|---|---|---|
| M3 | 2014/1/28 14:00:00 | http://www.aa.co.jp/t1 | RT | - | - |
| M4 | 2014/1/28 13:03:00 | PREPARE FILES 9:00 TO 12:00 | - | G03 | - |
| M5 | 2014/1/28 13:02:00 | http://www.aa.co.jp/t1 | - | G04 | - |
| M6 | 2014/1/28 13:01:00 | MEETING 13:00 TO 14:00 | - | G03 | - |
| M8 | 2014/1/28 15:00:00 | MEETING 13:00 TO 14:00 | - | - | 2014/1/30 13:00 |
| ... | ... | ... | ... | ... | ... |

PORTABLE TERMINAL DEVICE SPECIFYING CONTENT RELATED TO FIRST APPLICATION AND COPYING CONTENT TO A SECOND APPLICATION UPON PREDETERMINED EVENT OR OPERATION

CROSS-REFERENCE TO RELATED APPLICATIONS

The present application claims priority to and incorporates by reference the entire contents of Japanese Patent Application No. 2014-021784 filed in Japan on Feb. 6, 2014.

BACKGROUND OF THE INVENTION

1. Field of the Invention

The present invention relates to a terminal device, a storage method, and an information processing program.

2. Description of the Related Art

In recent years, portable terminal devices such as smartphones and tablet PCs (Personal Computers) have spread drastically. On such a terminal device, according to a user operation, an application is activated to execute an intended process. For example, as the technology of activating the application, the technology of displaying a list of executable applications has been suggested (for example, Japanese Patent Application No. 2007-200243).

SUMMARY OF THE INVENTION

According to the exemplary embodiment, a terminal device according to the present application includes an acceptance unit, a detection unit, and a storage unit. The acceptance unit accepts a specifying operation for specifying a piece of content related to a first application. The detection unit detects a predetermined executing operation after the acceptance unit accepts the specifying operation. Upon detection of the executing operation by the detection unit, the storage unit stores the piece of content specified by the specifying operation in a storage region used by a second application.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a temporary storage unit according to the first embodiment;

FIG. 4 is a diagram illustrating an example of a content storage unit according to the first embodiment;

FIG. 7 is a diagram illustrating an example of a content storage unit according to the second embodiment;

DETAILED DESCRIPTION OF THE PREFERRED EMBODIMENTS

Modes (hereinafter referred to as "embodiments") of carrying out a terminal device, a storage method, and an information processing program according to the present application are described in detail with reference to the drawings. Note that the embodiments will not limit the terminal device, the storage method, and the information processing program of the present application. The same component in the embodiments below is denoted by the same reference symbol and the description thereto is not repeated.

First Embodiment

1-1. Storage Process

Figure 1:
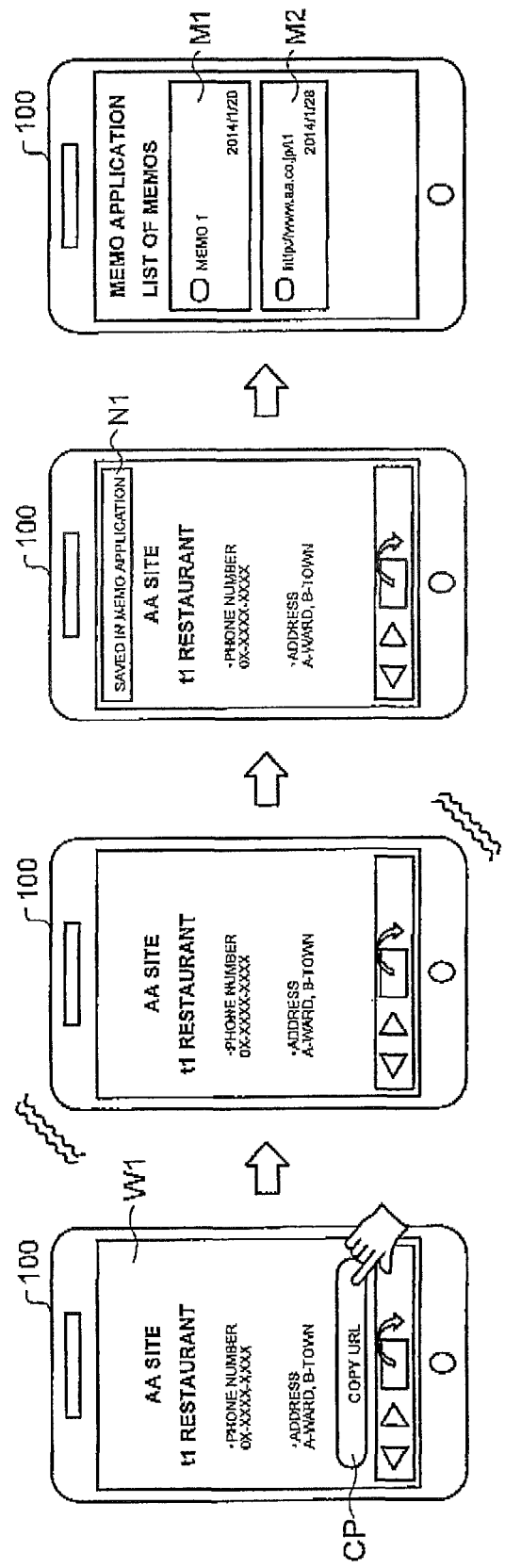
FIG. 1 is a diagram illustrating an example of a storage process according to a first embodiment.

First, an example of a storage process according to the first embodiment is described with reference to FIG. 1. FIG. 1 is a diagram illustrating an example of the storage process according to the first embodiment. FIG. 1 illustrates the example of storing content by a terminal device 100.

In the terminal device 100 illustrated in FIG. 1, the application of collecting pieces of content specified by a user and displaying a list of the collected pieces of content (hereinafter may be referred to as "memo application") is installed. As illustrated in FIG. 1, the terminal device 100 displays a web page W1 on a browser. The web page W1 is a page containing the information on "t1 restaurant" in "AA site" containing pieces of information on restaurants. Here, it is assumed that the user taps the copy button CP to copy the URL of the web page displayed on the terminal device 100. This enables the terminal device 100 to accept the specifying operation for specifying the URL "http://www.aa.co.jp/t1" of the web page W1. Then, the content specified by the specifying operation is stored in the temporary storage region of the terminal device 100.

Next, it is assumed that the user shakes the terminal device 100. In this case, the terminal device 100 detects the change in acceleration of the terminal device 100. Thus, the terminal device 100 detects the change in acceleration as the executing operation for executing the process for storing the content which has been stored in the temporary storage region in the storage region used by the memo application.

Then, upon the detection of the executing operation, the terminal device 100 stores the URL "http://www.aa.co.jp/t1"

of the web page W1 as the content specified by the specifying operation in the storage region used by the memo application.

Here, the terminal device 100 displays a message N1 that gives notice of the storage of the content specified by the specifying operation in the memo application. Thus, the URL "http://www.aa.co.jp/t1" of the web page W1 is stored as a memo M2 in the memo application.

Then, upon the acceptance of the activation operation in the memo application, the terminal device 100 displays the memo data stored in the storage region in the time series order. For example, as illustrated in FIG. 1, the terminal device 100 displays the newly stored memo M2 below the memo M1 stored in the storage region previously.

In this manner, upon the detection of the executing operation, the terminal device 100 according to the embodiment stores the content specified by the specifying operation in the storage region used by the memo application. Since this enables the terminal device 100 to easily store the content that is desired to be saved by the user, it is possible to reduce the time and effort for selecting the application that executes the intended process. Therefore, the terminal device 100 can reduce the burden on the user.

1-2. Structure of Terminal Device

Figure 2:
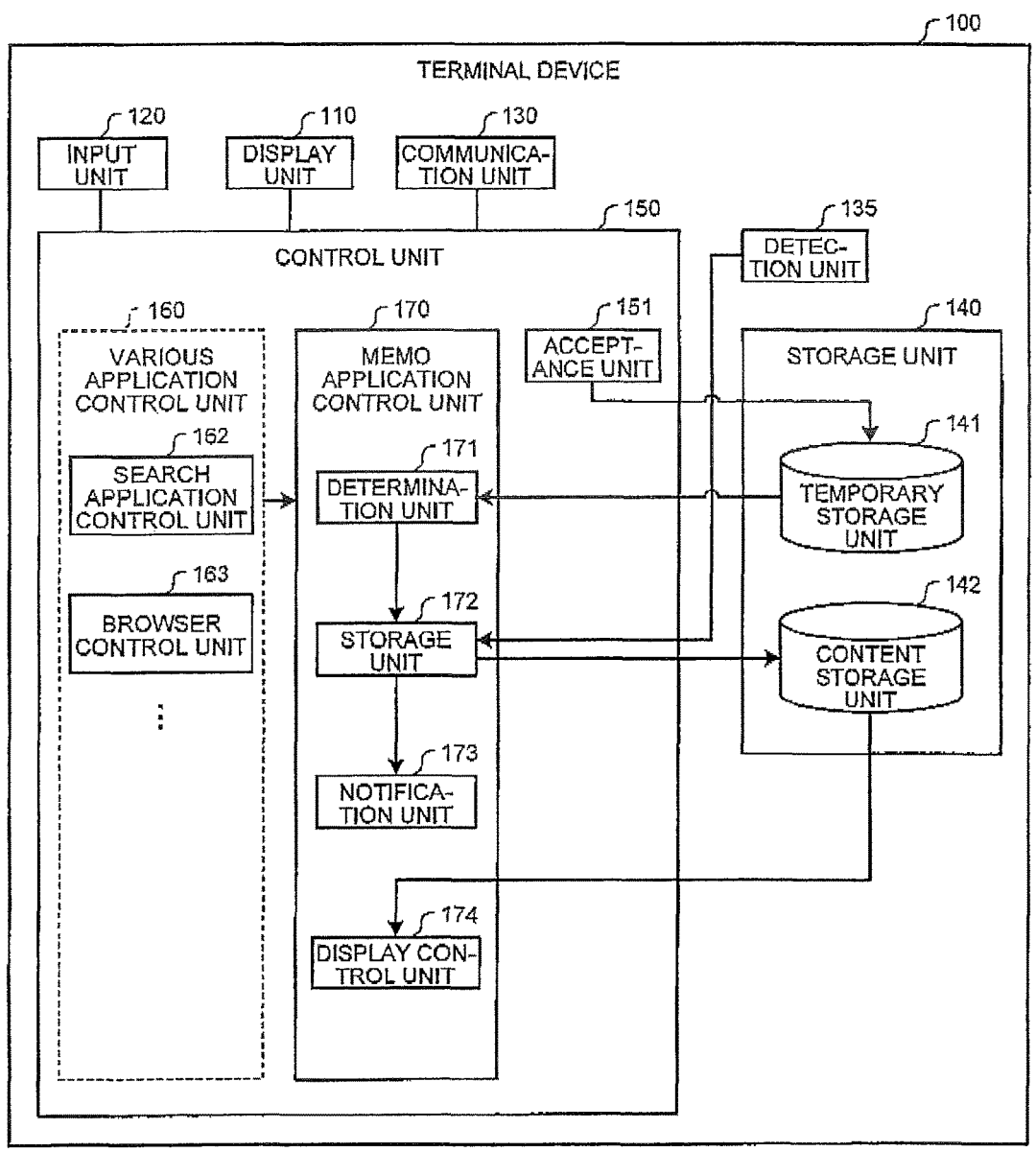
FIG. 2 is a diagram illustrating a structure example of a terminal device according to the first embodiment.

Next, the structure of the terminal device according to the first embodiment is described with reference to FIG. 2. FIG. 2 is a diagram illustrating a structure example of the terminal device according to the first embodiment. The terminal device 100 illustrated in FIG. 2 is an information processing device used by a user to browse web pages. For example, the terminal device 100 corresponds to a desktop PC (Personal Computer), a laptop PC, a tablet terminal, a cell phone, or PDA (Personal Digital Assistant). As illustrated in FIG. 2, the terminal device 100 includes a display unit 110, an input unit 120, a communication unit 130, a storage unit 140, and a control unit 150.

(Display Unit 110, Input Unit 120)

The display unit 110 is a display device that displays various pieces of information. For example, the display unit 110 is realized by a liquid crystal display. The input unit 120 is an input unit that accepts various operations from a user. The terminal device 100 according to the embodiment includes a touch panel, where the display unit 110 and the input unit 120 are integrated.

(Communication Unit 130)

The communication unit 130 is connected to a network, through which the information is transmitted and received between an information providing device that provides web pages, for example. The communication unit 130 is connected to the network with or without wires.

(Detection Unit 135)

A detection unit 135 is a detection device that detects a predetermined executing operation. Specifically, the change in physical motion of the terminal device 100 is detected. For example, the detection unit 135 is realized by an acceleration sensor. For example, if the terminal device 100 is moved by being shaken vertically or horizontally after an acceptance unit 151, which is described below, accepts the specifying operation, the detection unit 135 detects the change in acceleration as the predetermined executing operation.

(Storage Unit 140)

The storage unit 140 is realized by, for example, a semiconductor memory element such as a RAM (Random Access Memory) or a flash memory, or a storage device such as a hard disk or an optical disk. The storage unit 140 includes a temporary storage unit 141 and a content storage unit 142.

(Temporary Storage Unit 141)

The temporary storage unit 141 stores the content specified by a user. Specifically, the temporary storage unit 141 is a storage region called a clipboard or the like. For example, the temporary storage unit 141 stores the character string specified by the specifying operation out of the pieces of content displayed on the display unit 110. The content specified by the specifying operation is not limited to the character string but may be other pieces of data such as a still image or a motion image as long as the data can be specified by the specifying operation.

Here, FIG. 3 illustrates an example of the temporary storage unit 141 according to the embodiment. In the example of FIG. 3, the temporary storage unit 141 has items such as "content ID" and "content". "Content ID" represents the identification information for identifying the content. "Content" represents the stored content. In the example illustrated in FIG. 3, the character string like "http://www.aa.co.jp/t1" is stored in "content"; however, the still image, the motion image, the text data, the URL (Uniform Resource Locator), or the file path name indicating the storage location, which can be target contents specified by the specifying operation, may be stored alternatively.

In other words, FIG. 3 illustrates the example in which the content "http://www.aa.co.jp/t1" identified by content ID "M2" is stored in the temporary storage unit 141. Although it is illustrated in the example of FIG. 3 in which the old data are overwritten in the temporary storage unit 141 to store just the newest data, a plurality of pieces of data may be held without overwriting on the old data.

(Content Storage Unit 142)

The content storage unit 142 is the storage region used by the memo application. Specifically, the content storage unit 142 stores the content specified by a user. For example, the content storage unit 142 stores the content specified by the user from the temporary storage unit 141. Here, FIG. 4 illustrates an example of the content storage unit 142 according to the embodiment. In the example of FIG. 4, the content storage unit 142 has items such as "content ID", "save date and time", and "content".

"Content ID" represents the identification information for identifying the content. "Save date and time" represents the date and time on which the content is stored. "Content" represents the stored content.

In other words, in FIG. 4, the content "http://www.aa.co.jp/t1" that is identified by content ID "M2" is stored on "2014/1/28 14:00:00".

(Control Unit 150)

The control unit 150 is realized by having a CPU (Central Processing Unit) or an MPU (Micro Processing Unit) execute various programs stored in the memory device inside the terminal device 100 by using the RAM as a work area. The control unit 150 is realized by, for example, an integrated circuit such as ASIC (Application Specific Integrated Circuit) or an FPGA (Field Programmable Gate Array).

As illustrated in FIG. 2, the control unit 150 includes the acceptance unit 151, a various application control unit 160, and a memo application control unit 170.

(Acceptance Unit 151)

The acceptance unit 151 accepts the specifying operation that specifies a piece of content related to a first application (for example, browser). For example, the acceptance unit 151 accepts the specifying operation that specifies the character string related to the web page displayed on the browser. The acceptance unit 151 may accept the specifying operation that specifies the image or voice as well as the character string.

(Various Application Control Unit 160)

The various application control unit 160 includes, for example, a search application control unit 162 and a browser control unit 163. The search application control unit 162 executes and controls the search application that searches various pieces of information in the terminal device 100. The browser control unit 163 executes and controls the application called a web browser.

Note that the control unit 150 includes, in addition to the search application control unit 162 and the application control unit in the browser control unit 163 illustrated in FIG. 2, an application control unit that executes and controls each of applications installed in the terminal device 100. For example, the control unit 150 may have an application control unit that executes and controls an application that accesses the weather forecast site or an application control unit that executes and controls an application that accesses the auction site.

(Memo Application Control Unit 170)

The memo application control unit 170 executes and controls the memo application that stores the content specified by a user (such as a character string). The memo application as above may be either installed in the terminal device 100 in advance or installed in the terminal device 100 by being downloaded from a server device (such as a server device that provides various applications) based on user operation. The memo application control unit 170 includes, as illustrated in FIG. 2, a determination unit 171, a storage unit 172, a notification unit 173, and a display control unit 174, and achieves or executes the function or operation of the information process as described below. The internal structure of the memo application control unit 170 is not limited to the structure illustrated in FIG. 2 and may be a different structure as long as the information process as below is performed. The connection relation among process units in the control unit 150 and the memo application control unit 170 is not limited to the connection relation illustrated in FIG. 2 and may be a different connection relation.

(Determination Unit 171)

The determination unit 171 determines whether the predetermined executing operation has been detected or not. Specifically, after the acceptance of the specifying operation for specifying the content related to the arbitrary application, the determination unit 171 determines whether the predetermined executing operation has been detected by the terminal device 100 or not. For example, the determination unit 171 determines whether the change in acceleration of the terminal device 100 has been detected by the detection unit 135 as the predetermined executing operation or not.

(Storage Unit 172)

The storage unit 172 stores the content specified by the user in the content storage unit 142. Specifically, upon the detection of the executing operation by the detection unit 135, the storage unit 172 stores the content specified by the specifying operation in the content storage unit 142 used by the memo application control unit 170. For example, the storage unit 172 acquires the content specified by the specifying operation from the temporary storage unit 141 and stores the acquired content in the content storage unit 142.

Description is made of this point with reference to the examples of FIG. 3 and FIG. 4. Upon the detection of the executing operation by the detection unit 135, the storage unit 172 stores in the content storage unit 142, the content "http://www.aa.co.jp/t1" with the content ID "M2" stored in the temporary storage unit 141. Thus, the content storage unit 142 stores the content ID "M2" in association with the content "http://www.aa.co.jp/t1" as illustrated in FIG. 4.

(Notification Unit 173)

The notification unit 173 outputs the notification related to the content. Specifically, upon the storage of the content in the content storage unit 142 by the storage unit 172, the notification unit 173 outputs the message giving notice of the storage of the content, to the display unit 110. For example, the notification unit 173 outputs the message N1, which is displayed in an upper part of the screen of the terminal device 100 as illustrated in FIG. 1.

(Display Control Unit 174)

The display control unit 174 controls the display of the content. Specifically, upon the acceptance of the activation operation for activating the memo application, the display control unit 174 displays the pieces of content stored in the content storage unit 142 by the storage unit 172 in the time series order. For example, as illustrated in FIG. 1, the display control unit 174 controls a display such that the newer the storage date and time of the pieces of content, the lower position they are displayed. Note that the display control unit 174 may control a display such that the newer the storage date and time of the pieces of content, the upper position they are displayed.

1-3. Storage Process Flow

Figure 5:
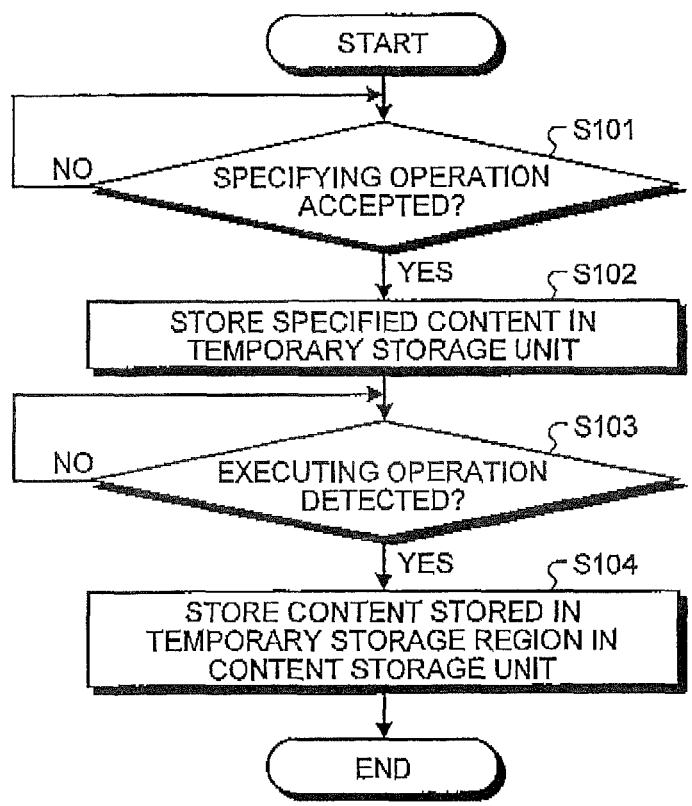
FIG. 5 is a flowchart illustrating a storage process procedure of the terminal device according to the first embodiment.

Next, description is made of the procedure of the storage process by the terminal device according to the first embodiment with reference to FIG. 5. FIG. 5 is a flowchart of the procedure of the storage process by the terminal device according to the first embodiment.

As illustrated in FIG. 5, the acceptance unit 151 of the terminal device 100 accepts the specifying operation for specifying the content related to the first application (for example, browser) (Step S101). Then, if the specifying operation has not been accepted yet (No in Step S101), the acceptance unit 151 stands-by until the unit accepts the specifying operation.

On the other hand, if the specifying operation has been accepted (Yes in Step S101), the acceptance unit 151 of the terminal device 100 stores the content specified by the specifying operation in the temporary storage unit 141 (Step S102).

Subsequently, after the acceptance of the specifying operation, the determination unit 171 of the terminal device 100 determines whether the predetermined executing operation has been detected by the detection unit 135 or not (Step S103). If it is not determined the executing operation is detected (No in Step S103), the determination unit 135 stands-by until it is determined that the executing operation is detected.

On the other hand, if it is determined the executing operation is detected by the determination unit 171 (Yes in Step S103), the storage unit 172 of the terminal device 100 stores the content specified by the specifying operation in the storage region used by a second application (for example, memo application) (Step S104). Specifically, the storage unit 172 stores in the content storage unit 142, the content stored in the temporary storage unit 141.

1-4. Effect of First Embodiment

As described above, the terminal device 100 according to the first embodiment includes the acceptance unit 151, the detection unit 171, and the storage unit 172. The acceptance unit 151 accepts the specifying operation for specifying a piece of content (for example, a character string) related to the first application (for example, browser). After the acceptance of the specifying operation by the acceptance unit 151, the detection unit 171 detects the predetermined executing operation. Upon the detection of the executing operation by the detection unit 171, the storage unit 172 stores the content specified by the specifying operation in the content storage unit 142 used by the second application (for example, memo application).

Thus, the terminal device 100 can store the content desired to be saved by the user; therefore, the time and effort for selecting the application that executes the intended process can be reduced. Moreover, the terminal device 100 can reduce the time and effort of the user to activate the second application when the content is stored. Thus, the terminal device 100 can reduce the burden on the user. Moreover, in the terminal device 100, the user does not know the activation of the second application and the second application is executed on the back-end side. The user can carry out an operation to store the content in the terminal device 100 without switching the activation from the first application to the second application. In other words, the user can carry out an operation continuously of the first application without a stop. Therefore, the terminal device 100 improves the operability of the user.

In the terminal device 100 according to the first embodiment, the acceptance unit 151 stores the content specified by the specifying operation in the temporary storage unit 141. The storage unit 172 stores the content stored in the temporary storage unit 141 by the acceptance unit 151, in the content storage unit 142 used by the second application.

Thus, in the terminal device 100 according to the first embodiment, the content specified by the user can be saved in the second application.

Moreover, in the terminal device 100 according to the first embodiment, the display control unit 135 displays the pieces of content stored in the content storage unit 142 by the storage unit 172 in the time series order.

Thus, since the terminal device 100 according to the first embodiment can display the pieces of content in the date and time order, the user-friendliness can be improved.

In the terminal device 100 according to the first embodiment, the determination unit 171 determines whether the terminal device 100 has detected the predetermined executing operation after the acceptance of the specifying operation for specifying the content related to the arbitrary application. If it is determined that the executing operation is detected by the determination unit 171, the storage unit 172 stores the content specified by the specifying operation in the content storage unit 142 used by the information processing program.

Thus, since the terminal device 100 can store the content desired to be saved by the user, the time and effort for selecting the application that executes the intended process can be reduced. Moreover, the terminal device 100 can reduce the burden on the user.

Second Embodiment

The terminal device 100 described in the first embodiment stores the content specified by the user in the content storage unit 142. A second embodiment will describe various processes related to the content performed by a terminal device 200.

2-1. Structure of Distribution Device

Figure 6:
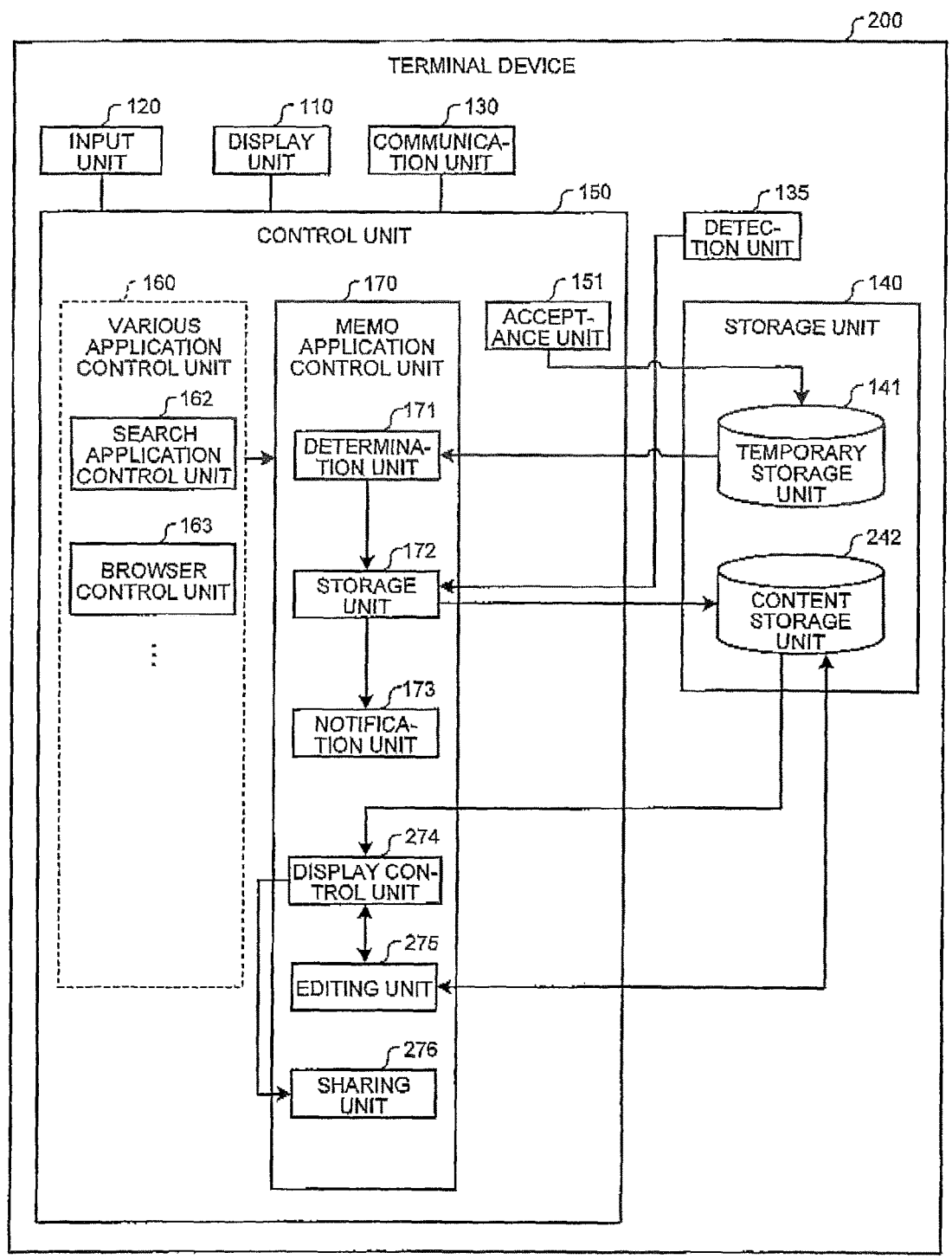
FIG. 6 is a diagram illustrating a structure example of a terminal device according to a second embodiment.

First, a structure of the terminal device 200 according to the second embodiment is described with reference to FIG. 6. FIG. 6 is a diagram illustrating a structure example of the terminal device 200 according to the second embodiment. As illustrated in FIG. 6, the terminal device 200 includes a content storage unit 242, a display control, unit 274, an editing unit 275, and a sharing unit 276 in addition to the units of the terminal device 100.

(Content Storage Unit 242)

FIG. 7 illustrates an example of the content storage unit 242 according to the second embodiment. In the example of FIG. 7, the content storage unit 242 further has items such as "category ID", "group ID", and "alarm time" in addition to the items of the content storage unit 142.

"Category ID" represents the identification information for identifying the category of the content. For example, "category ID" stores the IDs corresponding to the prepared categories such as "to-do list", "restaurant", "shopping", and "book". "Group ID" represents the identification information for identifying the group of the content. For example, the pieces of content with the same "group ID" are displayed collectively. "Alarm time" represents the date and time for giving notice of the information related to the content.

In other words, in the example of FIG. 7, the content "http://www.aa.co.jp/t1" identified by the content ID "M3" is stored with the category ID "RT" on "2014/1/28 14:00: 00". Moreover, the content "http://www.aa.co.jp/t1" identified by the content ID "M5" is stored with the group ID "G04" on the date "2014/1/28 13:02:00". Moreover, the content "meeting 13:00-14:00" identified by the content ID "M8" is stored with the alarm time "2014/1/30 13:00" on date and time "2014/1/28 15:00:00".

(Display Control Unit 274)

The display control unit 274 controls the display for the process performed by the editing unit 275 or the sharing unit 276 as compared to the display control unit 174. For example, the display control unit 274 displays the selection screen or the setting screen used in the process performed by the editing unit 275 or the sharing unit 276. Moreover, the display control unit 274 displays the information related to the content based on the various pieces of information such as "category ID", "group ID", and "alarm time" stored in the content storage unit 242.

(Editing Unit 275)

The editing unit 275 edits the content stored in the content storage unit 242 by the storage unit 172.

Figure 8:
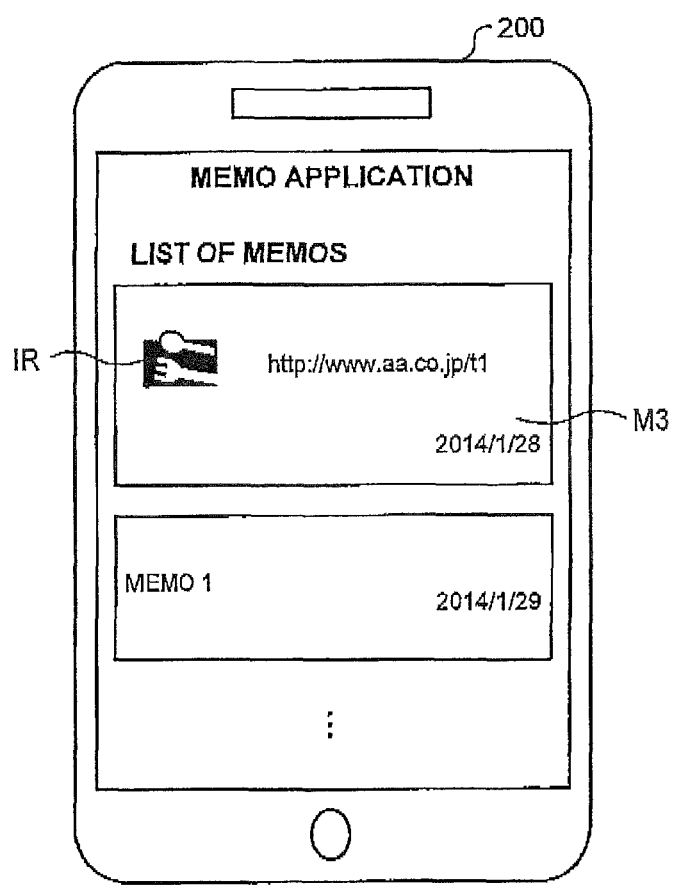
FIG. 8 is a diagram illustrating an example of a display screen.

For example, the editing unit 275 classifies the pieces of content stored in the content storage unit 242 by the storage unit 172 into the categories. Description is made of this point with reference to FIG. 7 and FIG. 8. FIG. 8 illustrates an example of the display screen.

In the example of FIG. 8, the editing unit 275 classifies the memo M3 in the category of restaurant. First, the editing unit 275 accepts the setting operation of the user for setting the category of memo. Then, upon the acceptance of the user's setting operation, the display control unit 274 displays the selection screen that displays the prepared categories such as "to-do list", "restaurant", "shopping", and "book".

Subsequently, the editing unit 275 accepts the selection operation of the user that selects the category corresponding to the content from among the categories displayed on the selection screen. Then, the editing unit 275 stores the category ID corresponding to the category selected by the selecting operation in the content storage unit 242 in association with the content.

For example, if the user has selected the category "restaurant" by selection operation, the editing unit 275 stores the category ID "RT" corresponding to the category "restaurant" in association with the content ID "M3" in the content storage unit 242. When the memo application is activated, the display control unit 274 displays the icon IR representing the category of restaurant over the memo M3 as illustrated in FIG. 8.

Thus, the terminal device 200 allows the user to know the category to which the content belongs; therefore, user-friendliness can be improved.

The selection of the category of the content is not limited to that of the user's selecting operation but may be the automatic selection of the optimum category based on the content. For example, the editing unit 275 classifies the content in the category based on the keyword included in the content.

Figure 9:
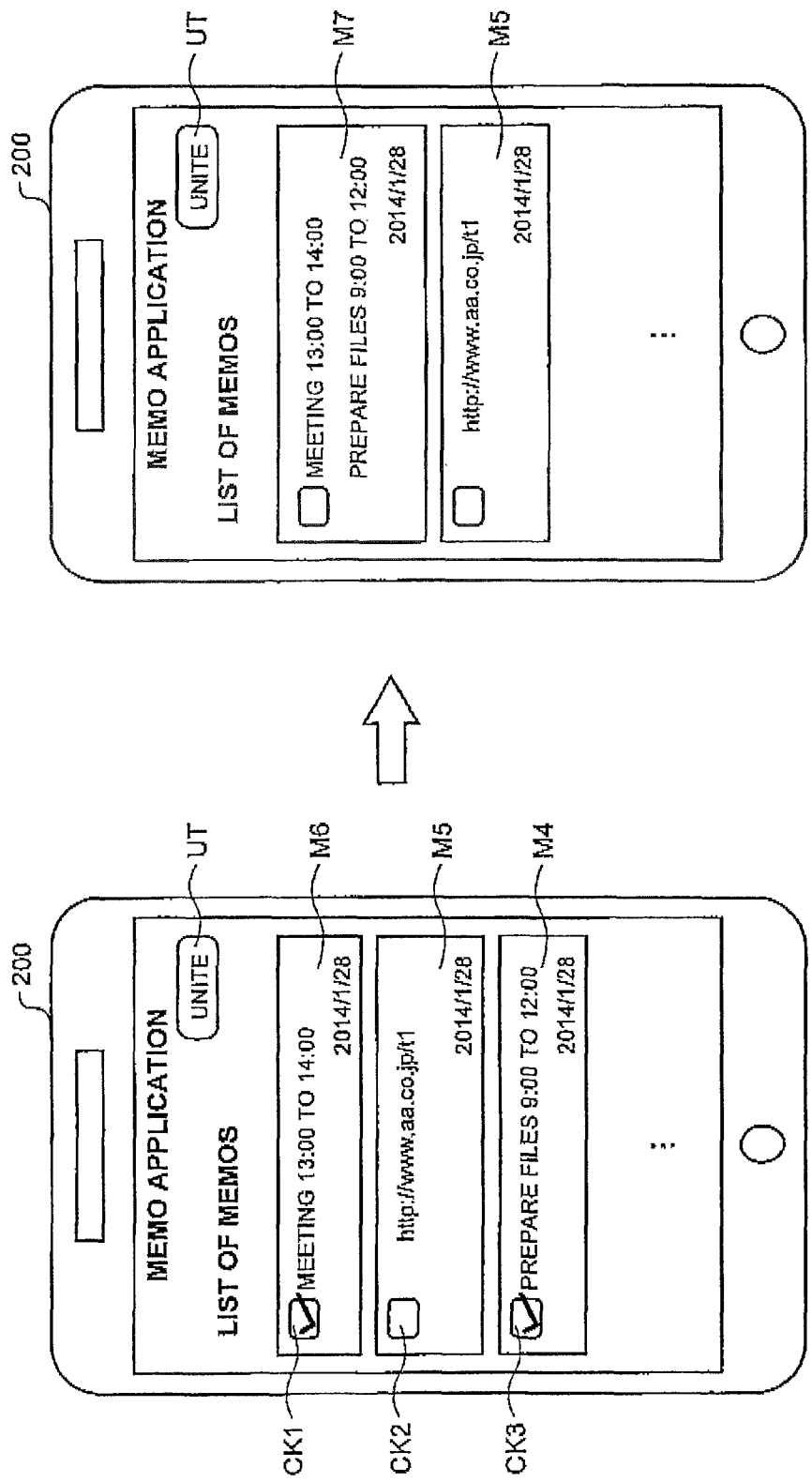
FIG. 9 is a diagram illustrating an example of the display screen.

In another example, the editing unit 275 unites a plurality of pieces of contents stored in the content storage unit 242 by the storage unit 172. Description is made of this point with reference to FIG. 7 and FIG. 9. FIG. 9 is a diagram illustrating an example of the display screen.

In the example of FIG. 9, the editing unit 275 unites the memo M4 and the memo M6. In this case, first, the display control unit 274 displays the check boxes CK1 to CK3 in the memo M4 to M6 as illustrated in FIG. 9. Then, the editing unit 275 accepts the user's selecting operation for selecting the memos to be united. The memos to be united can be selected by checking the box.

Here, it is assumed that the user checks the check boxes of the memo M4 and the memo M6 and then presses the unite button UT to unite the memos. In this case, the editing unit 275 stores the group ID "G03" in the content storage unit 242 in association with the content ID "M4" of the memo M4 and the content ID "M6" of the memo M6. Then, the display control unit 274 displays the memo M7 in which the pieces of content included in the memo M4 and the memo M6 with the same group ID "G03" are united, as illustrated in FIG. 9.

Thus, since the terminal device 200 can group the memos selected by the user's operation, user-friendliness can be improved.

Figure 10:
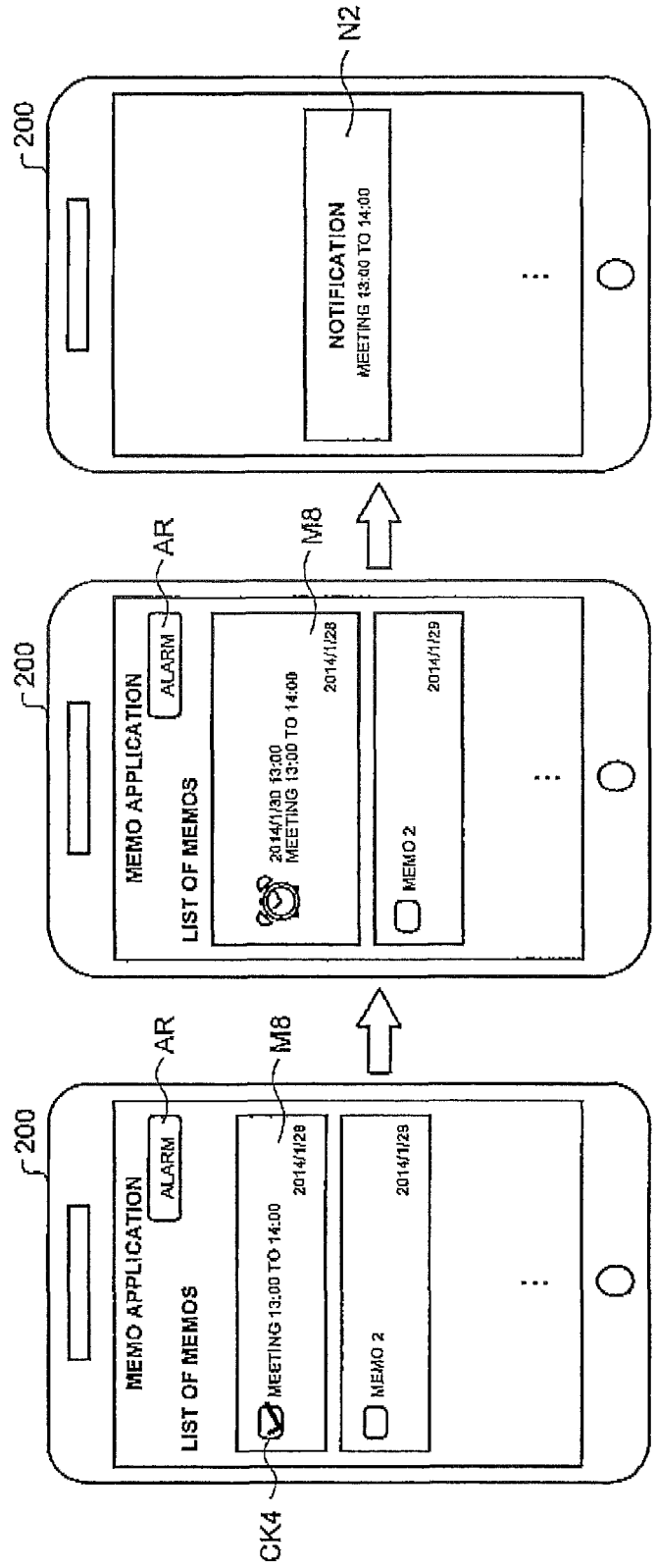
FIG. 10 is a diagram illustrating an example of the display screen.

In another example, the editing unit 275 sets the time for notifying the user of the content stored in the content storage unit 242 by the storage unit 172 of the information related to the content. Description is Made of this point with reference to FIG. 10. FIG. 10 illustrates an example of the display screen.

In the example of FIG. 10, the editing unit 275 sets the alarm time for notifying the user of the information written in the memo M6. In this case, the display control unit 274 displays the check box CK4 in the memo M4 as illustrated in FIG. 10. The editing unit 275 accepts the selecting operation for selecting a memo in which the alarm time is set. For example, the memo in which the alarm time is set is selected by checking the check box.

Here, it is assumed that the user checks the check box of the memo M8 and presses the alarm bottom AR for setting the alarm time of the memo. In this case, the display control unit 274 displays the time set screen for setting the alarm time. Then, it is assumed that the terminal device 200 accepts the alarm time of the memo M8 "2014/1/30 13:00". In this case, the editing unit 275 stores the alarm time "2014/1/30 13:00" in the content storage unit 242 in association with the content ID "M8" of the memo M8. Then, as illustrated in FIG. 10, the display control unit 274 displays the alarm time "2014/1/30 13:00" set by the user on the memo M8.

After that, the terminal device 200 displays the message N2 including the content of the memo M8 "meeting 13:00-14:00" when the current time is the alarm time "2014/1/30 13:00". Note that the terminal device 200 may display the message including the content when the current time becomes prior to a predetermined time after the alarm time. For example, the terminal device 200 displays the message N2 including the content of the memo M8 "meeting 13:00-14:00" when the current time becomes time "2014/1/30 12:50" that is 10 minutes before the alarm time "2014/1/30 13:00".

Thus, the terminal device 200 can give notice of the information related to the memo at the time desired by the user, and therefore, user-friendliness can be improved.

Figure 11:
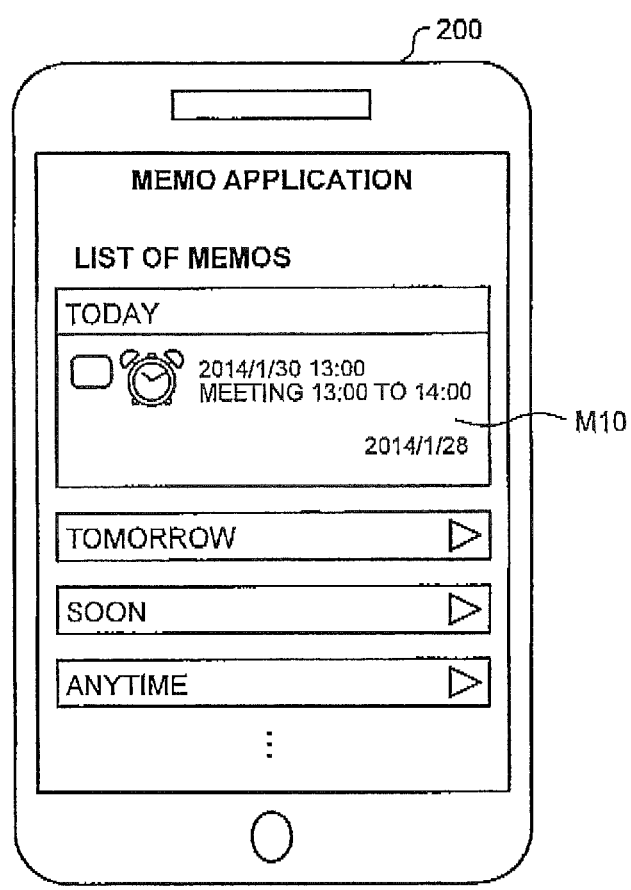
FIG. 11 is a diagram illustrating an example of the display screen.

Note that the terminal device 200 may display the content stored in the content storage unit 242 based on the alarm time. For example, the terminal device 200 displays the alarm time by sorting the time into predetermined categories. Description is made of this point with reference to FIG. 11. FIG. 11 is a diagram illustrating an example of the display screen. For example, the terminal device 200 displays the memos by sorting the alarm times into a category including "today", "tomorrow", "soon", "anytime", etc. as illustrated in FIG. 11.

Here, if "today" is selected, the memo on which the set the alarm time belongs to the time of today is displayed. For example, if today is Jan. 30, 2014, the memo M10 on which the alarm time is 2014/1/30 13:00" is displayed as illustrated in FIG. 11. If "tomorrow" is selected, the memo on which the alarm time belongs to the time of tomorrow is displayed. If "soon" is selected, the memo whose alarm time is within a predetermined period from today is displayed. For example, if "soon" is selected, the memo whose alarm time belongs to the arbitrary period such as "within three days" or "within a week" is displayed. If "anytime" is selected, for example, the memo that notifies the information related to the content at random time till the set alarm time is displayed. Note that if "anytime" is selected, the memo whose alarm time does not belong to any category or alarm time is not set may be displayed.

Since this enables the terminal device 200 to display the content according to the alarm time, user-friendliness can be improved.

(Sharing Unit 276)

Figure 12:
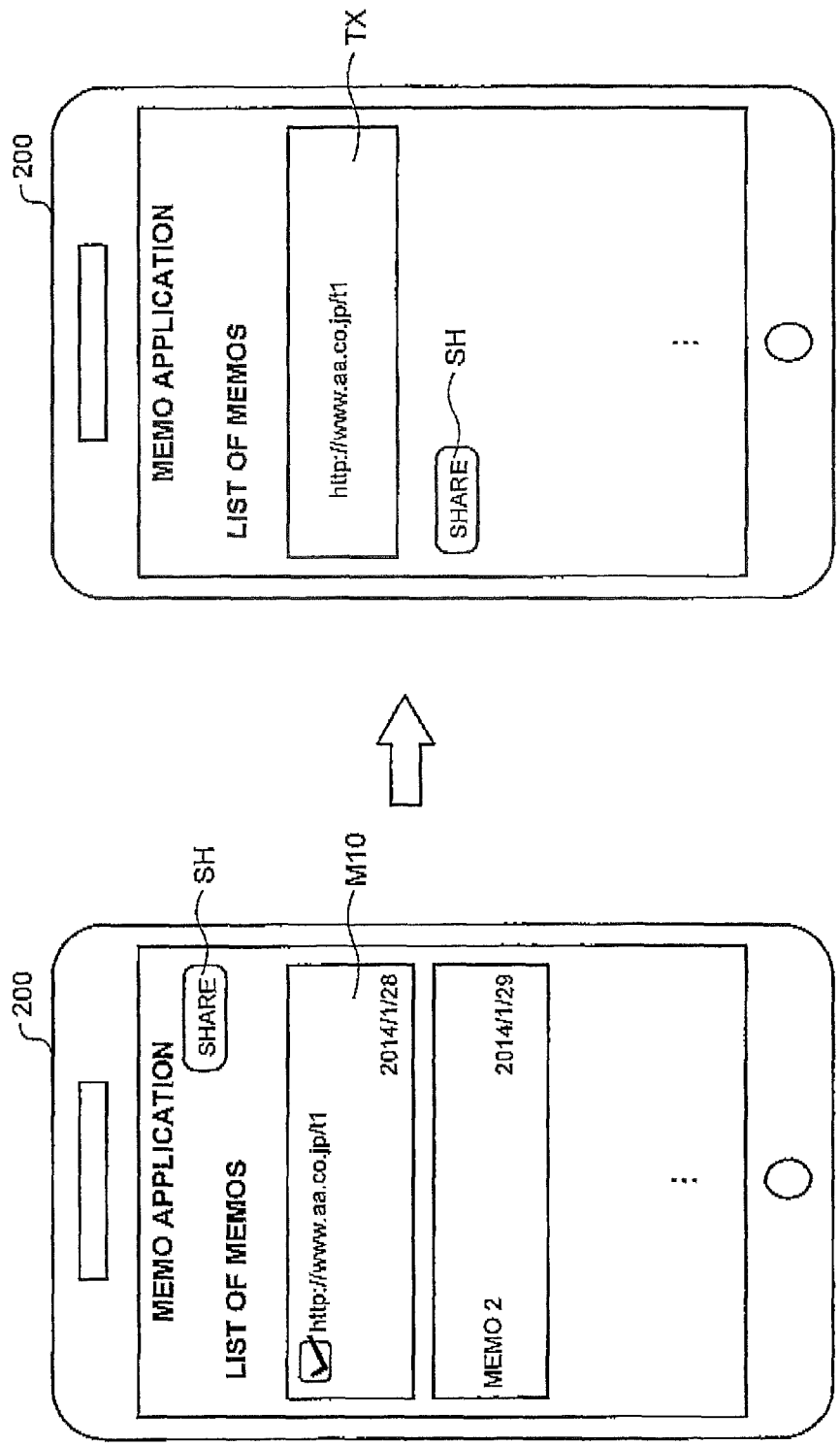
FIG. 12 is a diagram illustrating an example of the display screen.

The sharing unit 276 shares the content stored in the content storage unit 242 by the storage unit 172 with another application. Description is made of this point with reference to FIG. 12. FIG. 12 illustrates an example of the display screen.

In the example of FIG. 12, the sharing unit 276 shares the memo M10 with another application. The display control unit 274 displays the check box in the memo M10 as illustrated in FIG. 12. Then, the sharing unit 276 accepts the selecting operation for selecting a memo to be shared with another application. For example, the memo to be shared with another application is selected by Checking the box.

Here, it is assumed that the user checks the check box in the memo M10 and presses a share bottom SH to post the memo in another application. In this case, the display control unit 274 displays the editing screen where the content of the memo M10 can be edited. As illustrated in the right part of FIG. 12, the editing screen displays the text box TX where the text included in the memo 10 is edited. Moreover, the editing screen displays a post button PT for posting the content input in the text box TX in another application.

Here, upon the press of the post bottom PT by the user, the sharing unit 276 posts the content input in the text box TX in another application.

Since this enables the terminal device 200 to share the content with another application, user-friendliness can be improved.

2-2. Effect of Second Embodiment

As described above, the terminal device 200 according to the second embodiment includes the editing unit 275 and the sharing unit 276. The editing unit 275 edits the content stored in the storage unit 172.

In the terminal device 200 according to the second embodiment, the editing unit 275 classifies the pieces of content stored in the content storage unit 242 by the storage unit 172 into the categories.

Since the terminal device 200 according to the second embodiment thus enables the user to know the category to which the content belongs, user-friendliness can be improved.

Moreover, in the terminal device 200 according to the second embodiment, the editing unit 275 units the pieces of content stored in the content storage unit 242 by the storage unit 172.

Since the terminal device 200 according to the second embodiment thus enables the user to put together the memos selected by the user's operation, user-friendliness can be improved.

In the terminal device 200 according to the second embodiment, the editing unit 275 sets the time for notifying the user of the content stored in the content storage unit 242 of the information related to the content, by the storage unit 172.

Since the terminal device 200 according to the second embodiment can give notice of the information related to the memo at the time desired by the user, user-friendliness can be improved.

In the terminal device 200 according to the second embodiment, the sharing unit 276 shares the content stored in the content storage unit 242 by the storage unit 172 with another application.

Since the terminal device 200 according to the second embodiment allows the share of the content with another application, user-friendliness can be improved.

Third Embodiment

In the terminal device 100 described in the first embodiment, the content specified by the user is stored in the content storage unit 142. A third embodiment will describe the process of activating the memo application continuously by a terminal device 300.

3-1. Structure of Distribution Device

Figure 13:
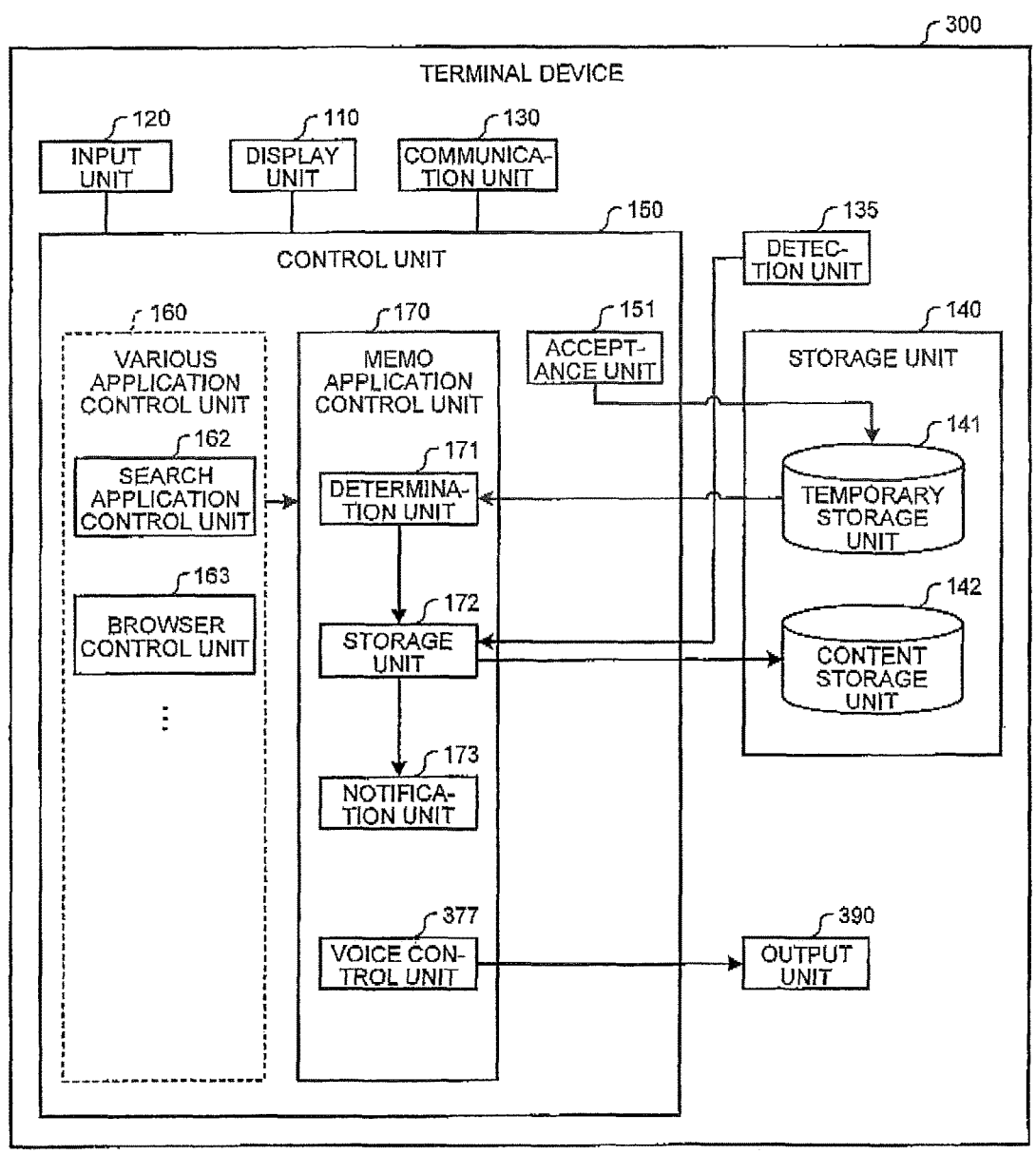
FIG. 13 is a diagram illustrating a structure example of a terminal device according to a third embodiment.

First, a structure of the terminal device 300 according to the third embodiment is described with reference to FIG. 13. FIG. 13 is a diagram illustrating a structure example of the terminal device 300 according to the third embodiment. As illustrated in FIG. 13, the terminal device 300 includes an output unit 390 and a voice control unit 377 (corresponding to an example of a signal control unit) in addition to the terminal device 100.

Output Unit 390

The output unit 390 is an output device that outputs voice. Specifically, the output unit 390 is realized by a speaker, for example. The output unit 390 outputs the voice in accordance with the voice control by the voice control unit 377 to be described below.

Voice Control Unit 377

The voice control unit 377 controls the output of signals (for example, voice) at shorter intervals than the period till the start of the function to stop the activation of the second application (for example, memo application) so that the activation of the second application will not be stopped by the control of basic software that processes the second application. This is because, depending on OS (Operation System), the control unit 150 may stop the application if a predetermined condition is satisfied. For example, the control unit 150 may stop the application if no output is made for a predetermined period with the application being activated in the background.

In view of this, the voice control unit 377 controls the output of the voice at intervals shorter than the period till the start of the function to stop the activation of the application so that the activation of the application will not be stopped. Here, the voice control unit 377 outputs the voice on mute when the voice is output at predetermined intervals. The voice is output on mute in order not to cause trouble to the user. For example, if the application is to be stopped when no output is made for three minutes, the voice control unit 377 outputs the voice on mute temporarily from the output unit 190 when 2 minutes 59 seconds has passed. Note that the terminal device 300 not only outputs the voice so that the activation of the application will not be stopped, but also may output various signals that can detect the activation of the application with the basic software. For example, the terminal device 300 outputs light from an LED used in the camera function so that the activation of the application will not be stopped.

Since this can prevent the stop of the activation of the application in the terminal device 300, it is possible to maintain the state in which the specified content can be stored in the memo application. Moreover, since the terminal device 300 outputs the voice on mute, the user can activate the application continuously without causing a trouble to a user.

As described above, the terminal device 300 according to the third embodiment includes the voice control unit 377. The voice control unit 377 controls the output of the signals at the predetermined intervals shorter than the period till the start of the function to stop the activation of the second application so that the activation of the application will not be stopped by the control of the basic software that processes the second application.

Since the terminal device 300 according to the third embodiment can prevent the stop of the activation of the application, it is possible to maintain the state in which the specified content can be stored in the memo application.

4. Modified Example

The terminal device 100 and the terminal device 200 according to the above embodiments may be carried out in different modes other than the above embodiments. Description is hereinafter made of another embodiment of the terminal device 100 and the terminal device 200. The terminal device 100 and the terminal device 200 described below perform the storage process for storing the specified content in the content storage unit 142.

4-1. Tagging Function

The terminal device 100 and the terminal device 200 described above may add a tag that links to the information related to the content stored in the content storage unit 142 to the content, and then store the content to the content storage unit 142.

Figure 14:
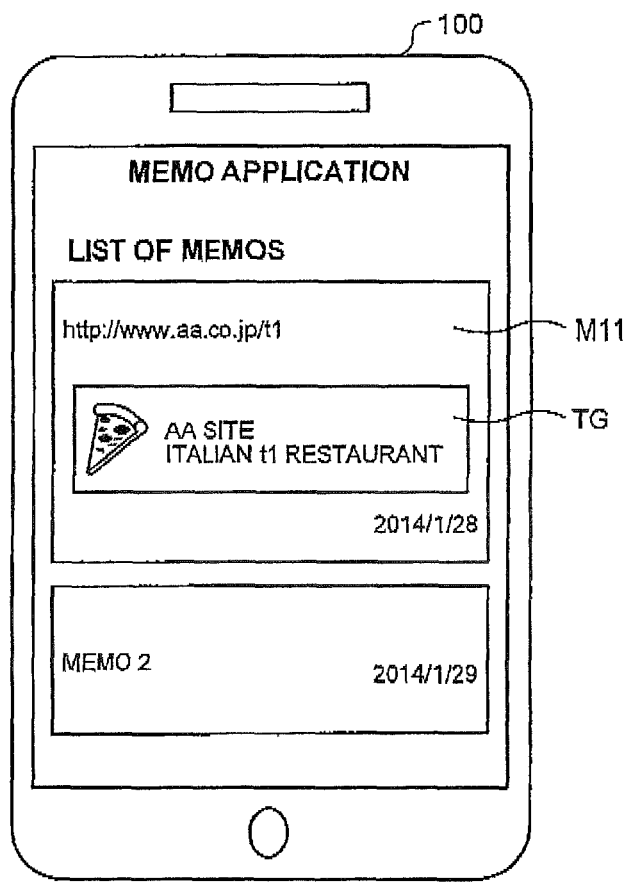
FIG. 14 is a diagram illustrating an example of the display screen.

Description is made of this point with reference to FIG. 14. FIG. 14 illustrates an example of the display screen. The terminal device 100 stores the content "http://www.aa.co.jp/t1" in the content storage unit 142. In this case, first, the terminal device 100 acquires a tag TG with the address linking to the web page "http://www.aa.co.jp/t1" as the information related to the content "http://www.aa.co.jp/t1". For example, the tag TG is acquired from an information providing device that provides the web page of "AA site".

Subsequently, the terminal device 100 adds the acquired tag TG to the content 'http://www.aa.co.jp/t1' and stores the content in the content storage unit 142. Then, the terminal device 100 displays the tag TG on the memo M11 as illustrated in FIG. 14.

In this manner, in the terminal device 100 according to the modified example, the tag linking to the information related to the content stored in the content storage unit 142 is added to the content and the content is stored in the content storage unit 142.

Thus, Since the terminal device 100 can provide the information related to the content to the user, user-friendliness can be improved.

4-2. Related Content

The terminal device 100 and the terminal device 200 may store the piece of content specified by the specifying operation in the content storage unit 142 in association with the related content related to that specified content.

Specifically, the terminal device 100 first extracts a piece of content including the keyword included in the content specified by the specifying operation among the pieces of content stored in the content storage unit 142. For example, if the content specified by the specifying operation includes the keyword "Tanaka", the terminal device 100 extracts the pieces of content including the keyword "Tanaka" from the content storage unit 142.

Then, the terminal device 100 stores the content specified by the specifying operation in the content storage unit 142 while associating the content to the extracted content. Thus, the terminal device 100 can, for example, display the pieces of content related to "Tanaka" in a lump.

In this manner, the terminal device 100 according to the modified example stores the content specified by the specifying operation in the content storage unit 142 while associating the content to the related content related to the specified content.

Since the terminal device 100 enables the user to know the content related to the content specified by the specifying operation, user-friendliness can be improved.

4-3. Executing Operation

The detection unit 135 of the terminal device 100 described above may detect the operation that can be identified by the basic software that processes the second application as the predetermined executing operation. Specifically, the detection unit 135 detects the change in physical motion of the terminal device 100 as the predetermined executing operation. For example, the detection unit 135 detects the change in acceleration of the terminal device 100 with the acceleration sensor as the executing operation. Note that the detection unit 135 may detect not just the change in, acceleration of the terminal device 100 but also other various operations as the executing operation. For example, the detection unit 135 detects a predetermined input operation such as the tapping, the flicking, or the dragging input through the input unit 120 as the executing operation.

In this manner, the terminal device 100 according to the modified example detects the operation that can be identified by the basic software that processes the second application as the predetermined executing operation. Moreover, the terminal device 100 detects the change in physical motion of the terminal device 100 as the predetermined executing operation. Thus, the terminal device 100 can detect the various operations as the executing operation.

Note that if there is a plurality of operations that can be identified by the basic software, the process of the second application corresponding to each operation is dealt with on the second application side in advance. Thus, if the operation set as the executing operation in advance among the operations that can be identified by the basic software has been detected, the terminal device 100 stores the content in the content storage unit 142. The operation detected as the executing operation by the terminal device 100 may be set arbitrarily by the user with the setting file of the second application or the like.

4-4. To-do List

The display control unit 174 of the terminal device 100 described above may create and display the check box for each of the items of the content. For example, as illustrated in FIG. 1, the display control unit 174 created and displays the check box like "to-do list" for each item of the content stored in the content storage unit 142.

In this case, the terminal device 100 accepts the operation of the user for checking the check box. The display control unit 174 displays the box checked by the user on the display unit 110.

Thus, in the terminal device 100 according to the modified example, the check box is provided and displayed for each item of the content. Therefore, by checking the box selected by the user, the display control unit 174 allows the user to know the confirmation of each item or the status of the process.

4-5. Storage Region

In the terminal device 100, the content may be stored not just in the storage region on the terminal device 100 but in the storage region on a cloud. In this case, the terminal device 100 stores the content specified by the user in the storage region on a cloud and stores the link information related to the content in the storage region of the terminal device 100. Thus, when the memo application is activated, the terminal device acquires the content from the storage region on the cloud based on the link information stored in the storage region of the terminal device 100. Then, the terminal device 100 displays the acquired content on the display unit 110. Thus, the terminal device 100 can expand the storage capacity of the content, so that user-friendliness can be improved.

4-6. Others

In the above embodiment, the user operation of selecting the button, the check box, or the link region of the web page displayed in the terminal device 100 is referred to as "tap"; however, the user operation is not limited to the tapping operation. For example, "tap" may be a tapping operation of the button through the click operation with a mouse or a selecting operation of the button with a gaze.

Among the processes described in the above embodiments, some or all of the processes performed automatically may be performed manually, or some or all of the processes performed manually may be performed automatically by a known method. Further, the procedure, the specific name, various pieces of data or information including parameters used in this specification or the drawings can be changed as appropriate unless otherwise stated. For example, the various pieces of information in each drawing are not limited to the information therein.

Moreover, the components of each device in the drawings are conceptual and are not necessarily structured exactly as illustrated from the physical point of view. In other words, the specific mode of the dispersion or integration in each device is not limited to the illustrated one and a part of or all the components may be configured by physical or functional dispersion or integration in any unit in accordance with the load or use circumstances of each kind. For example, the notification unit 173 and the display control unit 174 illustrated in FIG. 2 may be integrated.

4-7. Hardware Structure

Figure 15:
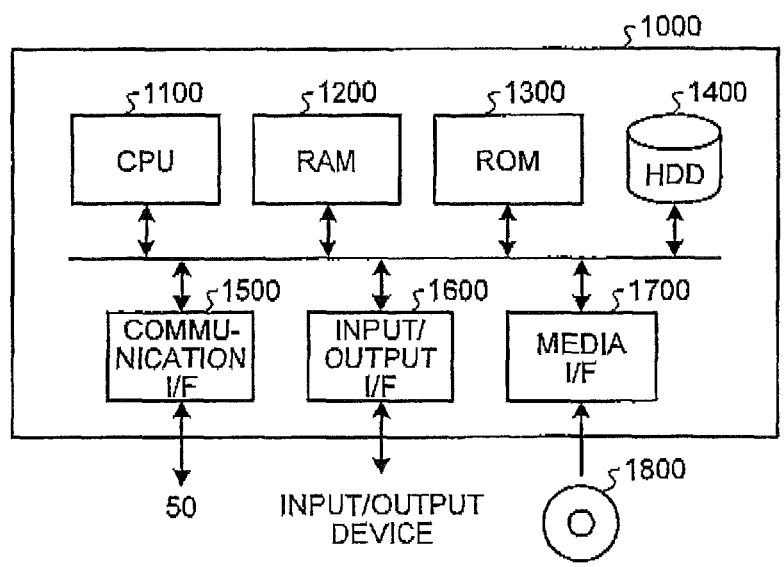
FIG. 15 is a hardware structure diagram illustrating an example of a computer that achieves the function of the terminal device.

The terminal device 100 and the terminal device 200 according to the above embodiments are realized by a computer 1000 with a structure as illustrated in FIG. 15. An example of the terminal device 100 is described. FIG. 15 is a hardware structure diagram illustrating an example of the computer 1000 that achieves the function of the terminal device 100. The computer 1000 includes a CPU 1100, a RAM 1200, a ROM 1300, an HOD 1400, a communication interface (I/F) 1500, an input/output interface (I/F) 1600, and a media interface (I/F) 1700.

The CPU 1100 operates based on a program stored in the ROM 1300 or the HDD 1400 to control each unit. The ROM 1300 stores a boot program to be executed by the CPU 1100 for activating the computer 1000, a program depending on the hardware of the computer 1000, and the like.

The HDD 1400 stores a program to be executed by the CPU 1100, data used by the program, and the like. The communication interface 1500 receives the data from another apparatus through a communication network 50 and transmits the data to the CPU 1100, and transmits the data generated by the CPU 1100 to the other apparatus through the communication network 50.

The CPU 1100 controls the output device such as a display or a printer and the input device such as a keyboard or a mouse through the input/output interface 1600. The CPU 1100 acquires the data from the input device through the input/output interface 1600. The CPU 1100 outputs the generated data to the output device through the input/output interface 1600.

The media interface 1700 reads the program or data stored in a recording medium 1800 and provides the program or data to the CPU 1100 through the RAM 1200. The CPU 1100 loads the program from the recording medium 1800 to the RAM 1200 through the media interface 1700 and then executes the loaded program. The recording medium 1800 corresponds to, for example, an optical recording medium such as a DVD (Digital Versatile Disc) or a PD (Phase change rewritable Disk), a magneto-optical recording medium such as an MO (Magneto-optical disk), a tape medium, a magnetic recording medium, or a semiconductor memory.

For example, when the computer 1000 functions as the terminal device 100 according to the embodiment, the CPU 1100 of the computer 1000 achieves the function of the control unit 150 by executing the program loaded on the RAM 1200. In the HOD 1400, the data in the temporary storage unit 141 or the content storage unit 142 are stored. The CPU 1100 of the computer 1000 reads the programs from the recording medium 1800 and executes the programs; in another example, the CPU 1100 may acquire the programs from another device through the communication network 50.

4-8. Effect

As described above, in the terminal device 100 and the terminal device 200 according to the modified example, the storage unit 172 adds the tag linking to the information related to the content stored in the content storage unit 142 to the content and stores the content in the content storage unit 142.

Thus, the terminal device 100 and the terminal device 200 according to the modified example can provide the user with the information related to the content; therefore, user-friendliness can be improved.

In the terminal device 100 and the terminal device 200 according to the modified example, the storage unit 172 stores the content specified by the specifying operation in the content storage unit 142 while associating the content with the related content related to that specified content.

Thus, the terminal device 100 and the terminal device 200 according to the modified example allow the user to know the content related to the content specified by the specifying operation; therefore, user-friendliness can be improved.

Moreover, in the terminal device 100 according to the modified example, the detection unit 135 detects the change in physical motion of the terminal device 100 as the predetermined executing operation.

Thus, the terminal device 100 according to the modified example can detect the predetermined executing operation.

The embodiments of the present application have been described so far based on the drawings; however, these embodiments are merely examples and the present invention can be carried out in another embodiment including various modifications or improvements based on the knowledge of a person skilled in the art, including the described aspect of the disclosure of the invention.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device for displaying content to a user of the terminal device, the terminal device comprising:
   a memory storing: (i) a temporary storage of a clipboard application, and (ii) a content storage of a second application; and
   a processor operatively coupled to the memory, the processor programmed to perform a process including:

displaying a first application that is executed on a display of the terminal device;

receiving a specifying operation by the user that specifies content related to the first application displayed on the terminal device when the first application is executed;

in response to receiving the specifying operation, executing the clipboard application and storing the specified content in the temporary storage of the clipboard application, without displaying the clipboard application;

detecting a predetermined executing operation performed in response to receiving the specifying operation;

in response to detecting the predetermined executing operation, retrieving the specified content from the temporary storage of the clipboard application; and executing the second application while displaying the first application, and storing the retrieved specified content in the content storage of the second application of the memory such that the specified content is retrievable by the second application, whereby the specified content from the first application is stored in the content storage of the second application without the clipboard application and the second application being displayed on the display of the terminal device.

2. The terminal device according to claim 1, wherein the processor is programmed to display in a time series manner the content stored in the content storage of the second application.

3. The terminal device according to claim 1, wherein the processor is programmed to edit the content stored in the content storage of the second application.

4. The terminal device according to claim 3, wherein the processor is programmed to classify the content stored in the content storage of the second application into categories.

5. The terminal device according to claim 3, wherein the processor is programmed to combine a plurality of pieces of content stored in the content storage of the second application.

6. The terminal device according to claim 3, wherein the processor is programmed to set a time for notifying the user of the terminal device regarding information related to the content.

7. The terminal device according to claim 1, wherein the processor is programmed to share the content stored in the content storage of the second application with a third application.

8. The terminal device according to claim 1, wherein the processor is programmed to output signals at intervals of time, and to stop operation of the second application in response to no signal being output from a predetermined period of time, each of the intervals of time being shorter than the predetermined period of time.

9. The terminal device according to claim 1, wherein the processor is programmed to:
add a tag that links to the specified content stored in the memory to the content of the first application; and
store the content in the content storage of the second application.

10. The terminal device according to claim 1, wherein the processor is programmed to:
store the specified content in the content storage of the second application; and
associate the stored content with related content that is related to the specified content.

11. The terminal device according to claim 1, wherein the processor is programmed to detect an operation that is identified by software processing the second application as the predetermined executing operation.

12. The terminal device according to claim 1, wherein the processor is programmed to detect a change in physical motion of the terminal device as the predetermined executing operation.

13. The terminal device of claim 1, wherein:
the processor is programmed to detect the predetermined executing operation performed in response to receiving the specifying operation without the second application being displayed on the display of the terminal device; and
the specified content from the first application is transferred from the first application and stored in the content storage of the second application while the first application is continuously displayed and without the second application being displayed on the display of the terminal device.

14. A storage method executed by a terminal device of a user, the storage method comprising:
displaying a first application that is executed on a display of the terminal device;
receiving a specifying operation by the user that specifies content related to a first application displayed on the terminal device when the first application is executed;
in response to receiving the specifying operation, executing a clipboard application and storing the specified content in a temporary storage of the clipboard application in a memory, without displaying the clipboard application;
detecting a predetermined executing operation performed in response to receiving the specifying operation;
in response to detecting the predetermined executing operation, retrieving the specified content from the temporary storage of the clipboard application; and
executing a second application while displaying the first application, and storing the retrieved specified content in a content storage of the second application of the memory such that the specified content is retrievable by the second application, whereby the specified content from the first application is stored in the content storage of the second application without the clipboard application and the second application being displayed on the display of the terminal device.

15. A non-transitory computer readable storage medium containing program instructions for storing contents, wherein execution of the program instructions by one or more processors of a computer system causes the one or more processors to perform:
displaying a first application that is executed on a display;
receiving a specifying operation by a user that specifies content related to a displayed first application when the first application is executed;
in response to receiving the specifying operation, executing a clipboard application and storing the specified content in a temporary storage of the clipboard application, without displaying the clipboard application;
detecting a predetermined executing operation performed in response to receiving the specifying operation;
in response to detecting the predetermined executing operation, retrieving the specified content from the temporary storage of the clipboard application; and
executing a second application while displaying the first application, and storing the retrieved specified content in a content storage of the second application such that the specified content is retrievable by the second application, whereby the specified content from the first application is stored in the content storage of the second application without the clipboard application and the second application being displayed on the display of the terminal device.

* * * * *